United States Patent
Rose et al.

(10) Patent No.: US 12,429,316 B2
(45) Date of Patent: Sep. 30, 2025

(54) DOSAGE PROJECTILE AND METHOD OF MANUFACTURE

(71) Applicant: SmartVet Pty Ltd, Fig Tree Pocket (AU)

(72) Inventors: Timothy Donald Rose, Fig Tree Pocket (AU); Hanns Dieter Bergs, Mountain Creek (AU); Grant Andrew Weyer, Noosa Heads (AU)

(73) Assignee: SMARTVET PTY LTD, Fig Tree Pocket (AU)

( * ) Notice: Subject to any disclaimer, the term of this patent is extended or adjusted under 35 U.S.C. 154(b) by 910 days.

(21) Appl. No.: 17/433,386

(22) PCT Filed: Feb. 26, 2020

(86) PCT No.: PCT/AU2020/050168
§ 371 (c)(1),
(2) Date: Aug. 24, 2021

(87) PCT Pub. No.: WO2020/172709
PCT Pub. Date: Sep. 3, 2020

(65) Prior Publication Data
US 2022/0146242 A1  May 12, 2022

(30) Foreign Application Priority Data
Feb. 27, 2019  (AU) ................................ 2019900629

(51) Int. Cl.
| | | |
|---|---|---|
| F42B 12/36 | (2006.01) | |
| A61D 7/00 | (2006.01) | |
| C08J 5/12 | (2006.01) | |
| C08K 7/14 | (2006.01) | |
| C08K 7/20 | (2006.01) | |
| F42B 12/76 | (2006.01) | |

(52) U.S. Cl.
CPC ............... *F42B 12/36* (2013.01); *A61D 7/00* (2013.01); *C08J 5/121* (2013.01); *F42B 12/76* (2013.01); *C08J 2323/12* (2013.01); *C08K 7/14* (2013.01); *C08K 7/20* (2013.01)

(58) Field of Classification Search
CPC ......... A61D 7/00; C08J 5/121; C08J 2323/12; C08K 7/14; C08K 7/20; F42B 12/36; F42B 12/76; F42B 6/10; F42B 8/14; F42B 12/40; F42B 12/46; A61M 37/00; A61M 2202/0007; A61M 2202/0241; A61M 2202/049; A61M 2202/206; A61M 2202/30; A61M 2250/00; A01N 25/34; B29C 65/02; B29C 66/122; B29K 2309/08; B29K 2623/12; B29K 2995/0017; B29K 2995/0063; B29K 2995/0077; B29K 2995/0082; B29K 2995/0097

See application file for complete search history.

(56) References Cited

U.S. PATENT DOCUMENTS

| | | | |
|---|---|---|---|
| 5,639,526 A | 6/1997 | Kotsiopoulos et al. | |
| 5,936,190 A | 8/1999 | Buzick | |
| 6,524,286 B1 | 2/2003 | Helms et al. | |
| 8,425,932 B2 | 4/2013 | Weyer et al. | |
| 8,802,135 B2 | 8/2014 | Weyer et al. | |
| 9,238,001 B2 | 1/2016 | Weyer et al. | |
| 2010/0203122 A1 | 8/2010 | Weyer et al. | |
| 2013/0303988 A1 | 11/2013 | Weyer | |
| 2015/0237849 A1 | 8/2015 | Weyer | |

FOREIGN PATENT DOCUMENTS

| | | |
|---|---|---|
| EP | 1043562 A2 | 10/2000 |
| WO | 2000/046565 A2 | 8/2000 |
| WO | 2012/034167 A1 | 3/2012 |
| WO | 2013/188928 A1 | 12/2013 |
| WO | 2014/179831 A1 | 11/2014 |

OTHER PUBLICATIONS

International Search Report and Written Opinion dated Apr. 28, 2020, issued in corresponding International Search Report PCT/AU2020/050168.

*Primary Examiner* — Snigdha Maewall
(74) *Attorney, Agent, or Firm* — Morgan, Lewis & Bockius LLP

(57) ABSTRACT

The present disclosure is directed to a polycell for forming a dosage projectile suitable for administering a biologically active agent to an animal remotely, the polycell comprising a first component having a semispherical shell formed from a polymer and a structural agent; a second component having a semispherical shell formed from a polymer and a structural agent; and a filling port in the first component or the second component; wherein the first and second components when joined form a polycell having a substantially spherical hollow body adapted to receive an agent to treat an animal. The present disclosure is also directed to a dosage projectile comprising an agent to treat an animal sealed in a polycell.

19 Claims, 3 Drawing Sheets

DOSAGE PROJECTILE AND METHOD OF MANUFACTURE

TECHNICAL FIELD

Figure 1:
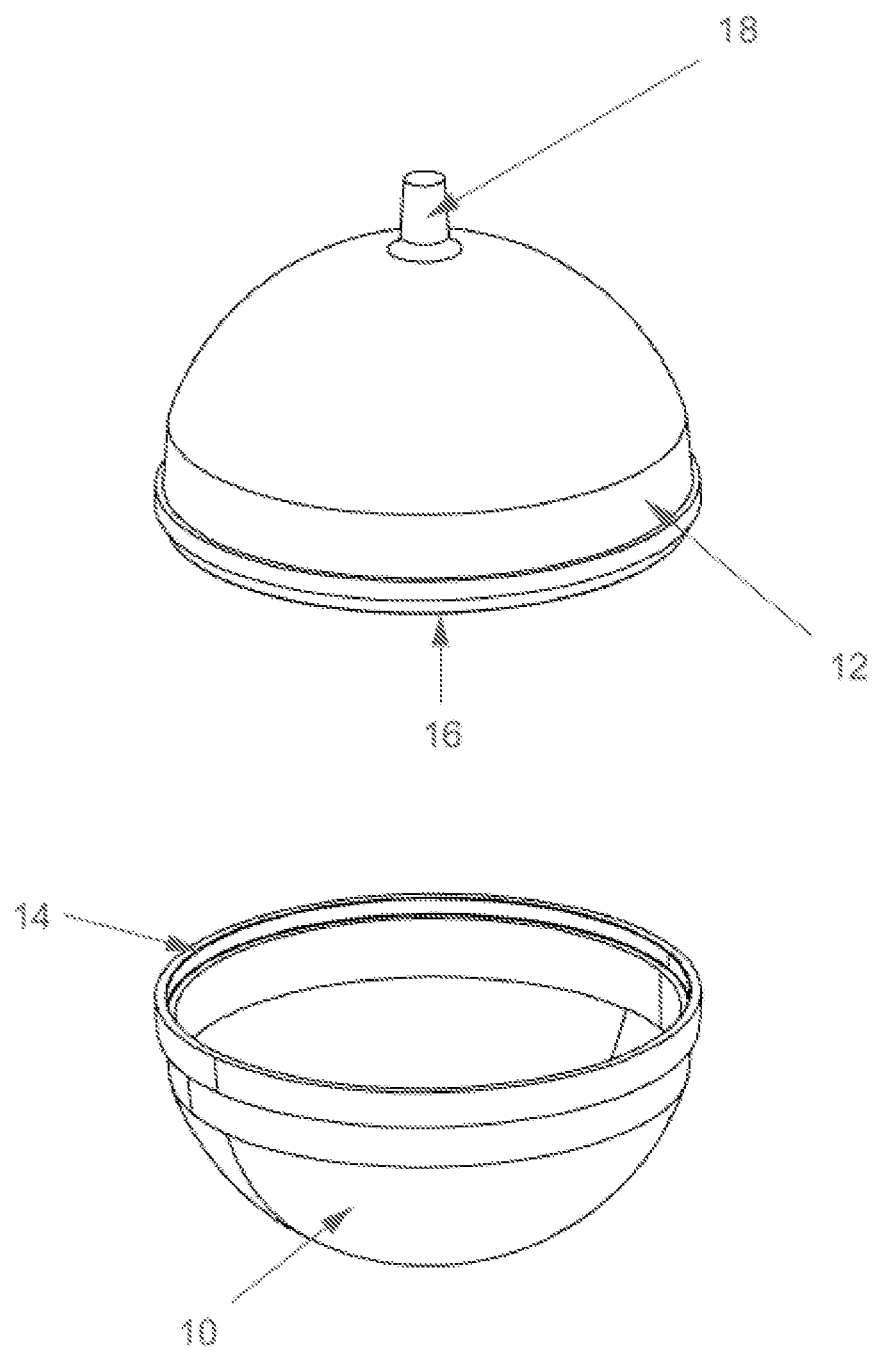

The technology relates to dosage projectiles suitable for remote treatment of animals such as livestock.

RELATED APPLICATION

This application is based on and claims priority to Australian provisional patent application No 2019900629 filed on 27 Feb. 2019, the content of which is incorporated by reference in its entirety.

BACKGROUND

Efficient delivery and management of treatment to animals such as livestock can be challenging, in particular, on farms where animals are free to move across vast portions of land, such as many beef cattle farms. It is also challenging for farmers to efficiently identify specific animals that require treatment and safely deliver the correct medical treatment and accurate dose if they do not have access to appropriate yards and handling facilities.

Prior art methods require the farmer to plan in advance which animals to treat and, for each animal, make a note of what treatment is to be administered. Furthermore, the animals have to be located and often gathered and moved to a pen, or similar handling facility, where they are identified, often visually by reading their ID number or brand. The animals are then treated with the required medicinal compounds. After the treatment has been administered, farmers need to create a record of the type and time of treatment provided to the specific animal.

Veterinary medicines, pesticides and vaccines can be administered to animals in different ways. For example, animals can be gathered and confined in special handling facilities where treatment can be administered by various methods such as injection, pour-on, intra-ruminal bolus or spray. In some instances, where cattle are too sick to be moved or where safe handling facilities are not available, a specially designed dart may be used to administer an injectable medicine or vaccine. Treatment can be administered more efficiently, and with less stress for the animal, by using systems that allow for remote delivery of a variety of types of medicaments. For example, U.S. Pat. Nos. 8,425,932; 8,802,135; 9,238,001; US 2013/0303988 and US 2015/0237849, the disclosure of which is incorporated herein by reference, disclose a launching system and a method for remotely treating an animal using dosage projectiles having frangible shells.

Although the present technology could be considered as analogous to paint ball technology, this is not the case. For example U.S. Pat. No. 5,639,526 (Perfect Circle Paint Ball, Inc) is directed to a paint ball including a paint ball shell which is impervious to water and which readily fractures upon striking a victim with a greatly decreased risk of physical harm to the victim. Structurally, a generally spherical paint ball shell has an axis of symmetry defining a first pole and a second pole in the paint ball shell. The axis of symmetry is substantially normal to a plane passing through the shell, which, for example, may define an equatorial plane. The paint ball shell defines an interior cavity for encapsulating a coloring agent. The paint ball shell is constructed such that upon application of a force at any impact point on the paint ball shell, sufficient to fracture the paint ball shell, the shell fractures in a pattern having a plurality of fracture lines extending from the impact point toward the first pole and toward the plane and toward the second pole. In this way, the risk of harm or injury from the paint ball is greatly reduced. In paintball, the objective is to splatter the paint in as many directions as possible as this is how a competitor is 'marked' and thereby eliminated from the game. The paint ball of U.S. Pat. No. 5,639,526 cannot be adapted for use in the remote treatment of an animal as it would fail to deliver sufficient or effective amount of an active agent to the animal.

The present inventors have developed an improved dosage projectile adapted to deliver an agent to an animal remotely.

SUMMARY

In a first aspect, there is provided a polycell for forming a dosage projectile suitable for administering a biologically active agent to an animal remotely, the polycell comprising:
  a first component having a semispherical shell formed from a polymer and a structural agent;
  a second component having a semispherical shell formed from a polymer and a structural agent; and
  a filling port in the first component or the second component;
  wherein the first and second components when joined form a polycell having a substantially spherical hollow body adapted to receive an agent to treat an animal.

In an embodiment the first component has a first circumferential edge, the second component has a second circumferential edge, wherein the first circumferential edge and second circumferential edge are adapted to form a temporary joint system that engages to allow permanent joining of the first and second components to form the polycell having a substantially spherical hollow body.

In an embodiment there is provided a joint system about the edge of the shells to facilitate joining of the two components.

In an embodiment the joint system comprises overlapping edges on the first and second components that clip together to form an outer surface suitable for joining together using heat to create a hermetic seal.

In order to develop the present technology the hydrodynamic behaviour of the contents of dosage projectiles made from polycells on impact were studied. The polymer was modified by adding structural agents to cause a fragmentation pattern that minimizes splatter and maximizes the delivery of the contents onto a focal area of the surface of the skin of an animal, thereby providing more effective treatment delivery.

In an embodiment the polymer is an organic polymer is selected from:
  polyamide polymers including those derived from sebacic acid,
  polymers derived from vegetable oil acids with or without dimerization, terephthalic acid and/or ethylenediamine,
  polypropylene homopolymers or copolymers,
  polyphenylene sulphide,
  polylactic acid, and
  monomers of ethylene.

In an embodiment the polymer may be processed in such a way as to deliver atactic, syndiotactic or isotactic polymerization, subjected to UV light and or mechanically stretched; in order to develop desirable polymer crystallization and compatibility with the structural agents to produce the desired hydrodynamic fragmentation characteristics.

The structural agent imparts or enhances the required properties to the shell so the polycell can be used as a dosage projectile. In an embodiment the structural agent can be selected from one or more of:

Silicon dioxide,
Sodium carbonate,
Calcium oxide,
Magnesium oxide,
Aluminium oxide,
Glass spheres
Glass bubbles,
Glass fibres,
Glass rods,
Calcium carbonate, and
Talcum powder.

In an embodiment the polycell is made from atactic polypropylene with about 40% structural agent comprised of about 80% silicon dioxide, about 15% sodium carbonate, about 4% calcium oxide, about 0.5% magnesium oxide, and about 0.5% aluminium oxide.

In an embodiment the polycell is made from polypropylene homopolymer with structural agent comprising about 1 to 55% (wt/wt) glass beads and about 1 to 55% (wt/wt) glass fibre.

In an embodiment the polycell is made from polypropylene homopolymer with structural agent comprising about 1 to 55% (wt/wt) glass bubbles and about 1 to 55% (wt/wt) glass fibre.

In an embodiment the polycell is made from polypropylene copolymer with structural agent comprising about 20% (wt/wt) glass beads and about 20% (wt/wt) glass fibre.

In an embodiment the polycell is made from polyphenylene sulphide with structural agent comprising between about 20% and 70% silicon dioxide.

In an embodiment the polycell is made from a polymer selected from polyvinyl chloride with structural agent comprising about 1 to 55% (wt/wt) calcium carbonate and 1 to 55% glass bubbles In an embodiment the polycell is made from a polymer selected from monomers of ethylene with structural agent comprising between about 20% glass bubbles and 70% glass rods.

In an embodiment the shell has a wall thickness of about 1 mm or less.

In an embodiment the wall thickness of the shell is about 0.3 mm.

In an embodiment the polymer has one or more properties selected from:

Melt Flow Rate 12+g/10 min;
Tensile elongation 0.5-2.75% ASTM D638;
Izod notched 25-50 J/m ASTM D256;
Izod un-notched 50-170 J/m ASTM D256;
Melting Temp 180-250° C.;
Mold Temp 30-80° C.;
Mold Shrinkage 0.10-0.50% ASTM D955; and
Injection Pressure 60-120 Mpa.

In an embodiment the polymer has one or more further properties selected from:

Specific Gravity (SG) 0.9-1.50%;
Tensile Strength 30-50 Mpa ASTM D638;
Tensile Modulus 2000-5000 Mpa ASTM D638;
Flexural Strength 50-80 Mpa ASTM D790; and
Flexural Modulus 2500-50 Mpa ASTM D790.

In an embodiment the polymer is polypropylene homopolymer with about 20% (wt/wt) glass beads and about 20% (wt/wt) glass fibre having the properties:

Melt Flow Rate 20 g/10 min;
Tensile elongation 2.5% ASTM D638;
Izod notched 43 J/m ASTM D256;
Izod un-notched 160 J/m ASTM D256;
Melting Temp 191-232° C.;
Mold Temp 32-66° C.;
Mold Shrinkage 0.3% ASTM D955;
Injection Pressure 69-103 Mpa;
Specific Gravity (SG) 1.22%;
Tensile Strength 39 Mpa ASTM D638;
Tensile Modulus 4826 Mpa ASTM D638;
Flexural Strength 63 Mpa ASTM D790; and
Flexural Modulus 4482 Mpa ASTM D790.

In an embodiment the shell of the polycell is impervious to water and substantially stable to excipients and diluents used in liquid formulations of biologically active agents suitable for veterinary applications.

In an embodiment the shell of the polycell is resistant to a wide range of excipients and solvents.

In an embodiment the first and second components are made by injection moulding.

In an embodiment the first and second components are made by blow moulding.

In an embodiment the first and second components are joined by heat welding about the first and second edges to form a hermetically sealed polycell.

In an embodiment the first and second components are joined by laser welding.

In an embodiment the first and second components are joined by friction welding.

In an embodiment the first and second components are joined by ultrasonic welding.

In an embodiment the first and second components are joined by using a bonding agent or glue.

In an embodiment the first and second components are joined by mechanical friction.

In an embodiment the region of joining of the first and second parts does not substantially impede fragmentation of the polycell in use as a dosage projectile.

In an embodiment the joining of the first and second parts are suitable for very thin walled shells.

In an embodiment the polycell has a size of about 21 mm diameter with a volume of about 9.8 ml.

In an embodiment, the polycell is about 2.5×the size of a standard .68 calibre paintball.

In a second aspect, there is provided a dosage projectile suitable for administering a biologically active agent to an animal remotely, the projectile comprising:

a polycell according to the first aspect; and
a biologically active agent sealed in the polycell to treat an animal.

In an embodiment the dosage projectile in use has a fragmentation pattern that minimizes splatter and maximizes the delivery of the contents onto a focal area of the surface of the skin of an animal, thereby providing more effective treatment delivery.

In a third aspect, there is provided a method for treating an animal remotely, the method comprising impacting a dosage projectile according to the second aspect on an animal such that the dosage projectile fragments on impact to release the biologically active agent to treat the animal.

In a fourth aspect, there is provided a method for making a dosage projectile suitable for administering a biologically active agent to an animal remotely, the method comprising:

forming a first component having a semispherical wall from a polymer and structural agent;

forming a second component having a semispherical wall from a polymer and structural agent; one of the first or second components having a filling port;

joining the first and second components to form a polycell having a substantially spherical hollow body having a filling port;

introducing a biologically active agent into the polycell through the filling port; and sealing the filling port to form a dosage projectile containing the active agent.

In an embodiment the first component has a first circumferential edge, the second component has a second circumferential edge to form an interference joint that holds the two parts together for laser or heat welding. The first circumferential edge and the second circumferential edge are engaged and joined to form the polycell.

In an embodiment the filling port is closed by hermetic sealing by heat welding using a specially shaped heated tamper. The polycell is rotated while the heated tamper is lowered slowly melting the filling port while the polycell is cooled with bursts of pressurized air or $CO_2$. The result is prevention of flashing of volatile fill materials such as isopropyl alcohol, flashing causes internal pressure resulting in outgassing which prevents the creation of a hermetic seal as the molten polymer cools. Using the cooling method described it is possible to use the molten material to form a plug that hermetically seals contents inside the polycell.

In an embodiment the filling port is adapted to form a plug when hermetically sealed after the polycell has been filled with the biologically active agent to form the dosage projectile.

The dosage projectile contains one or more biologically active agents for treating an animal.

The biologically active agent is typically present at a concentration (% v/v) of from about 0.1% to 30%. It will be appreciated that the concentration of the biologically active agent will be related to the dosage required for a particular size of animal.

The biologically active agent can be a pharmacological agent such as a veterinary pharmaceutical or insecticide for treating insect pests or disease.

The biologically active agent can be a health supplement such as a vitamin or mineral.

The biologically active agent can be a vaccine or immunogenic compound. The biologically active agent may also include protein-based agents, such as crude or purified cell lysates, sub-unit vaccines, protein-based antigen display systems, antigens, peptides, oligopeptides, or polypeptides.

The biologically active agent may include drugs such as contraceptives, analgesics, anti-inflammatories, vasodilators, bronchodilators, diuretics, anti-histamines, tranquilizers, anti-fungals, vitamins, muscle relaxants, and anti-virals, anti-parasitic compositions, anthelmintics, acaricides, insecticides, and the like.

The biologically active agent may include a hormone such as a progesterone, estrogen, testosterone, derivatives thereof, and/or combinations of such hormones.

The biologically active agent may be poison or toxin used to kill an animal following administration or consumption.

The treatment of the animal may be for a parasite, pest, illness, nutritional deficiency, vaccination, pain management, management of fever (pyrexia), bacterial or viral infections, growth promotion, hormones, steroids, fertility enhancing agents or contraceptive agents, sterilization, appetite stimulants, rumen activity modulators.

In a fifrth aspect, there is provided a dosage projectile produced by the method according to the fourth aspect.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

In order that the present invention may be more clearly understood, preferred embodiments will be described with reference to the following drawings and examples.

BRIEF DESCRIPTION OF THE DRAWINGS

Features and advantages of the present invention will become apparent from the following description of embodiments thereof, by way of example only, with reference to the accompanying drawings, in which:

FIG. 1 shows an embodiment of the first and second components of the polycell;

FIG. 2 shows an embodiment of the polycell formed by joining the first and second components; and FIG. 3 shows a typical fragmentation pattern of the leading face of a dosage projectile formed from a polycell at impact.

FIG. 4 shows a dosage projectile after the filling port of the polycell has been melted to form a plug.

DESCRIPTION OF EMBODIMENTS

Introduction

Mechanical Properties of Polymers

For most applications, the choice of polymer material used depends upon a balance of stiffness, toughness, processability and price. There are number of standard tests that have been developed to measure these (and other) key performance parameters. For any particular application, a compromise between these features will usually be necessary. For example, it is generally accepted that within a given family of grades of a particular polymer, the rigidity increases as impact strength decreases. From a polymer industry standard, impact strength (brittleness), is generally an undesirable characteristic. A brittle polymer with very low chemical resistance qualities, such as polystyrene, has limited use cases in many industries, chemical resistance can be improved by modifying its tacticity, however the creation of an isotactic polystyrene can have a dramatic effect on the physical properties of the polymer, its processability and it's cost. In a commercial scenario high toughness, good processability and low price are all desirable features. This has resulted in an industry predisposed to regarding brittleness (lack of toughness) as a negative characteristic which polymer chemists spend much time trying to remedy.

In addition to the above, processing requirements may place an upper or a lower limit on the molecular weight (MW) of the polymer that can be used, and this will frequently influence the mechanical properties quite markedly.

Furthermore, any change in a specific polymer parameter may affect processability and basic physical properties. Both of these factors can interact in governing the behaviour of a fabricated article, its manufacturability and therefore it's feasibility as a commercially suitable material. Comprehensive experimental data are therefore necessary to understand effectively the behaviour of polymer materials, and to give a realistic and reliable guide to the selection of material and grades for a given application.

Polycells

Figure 2:
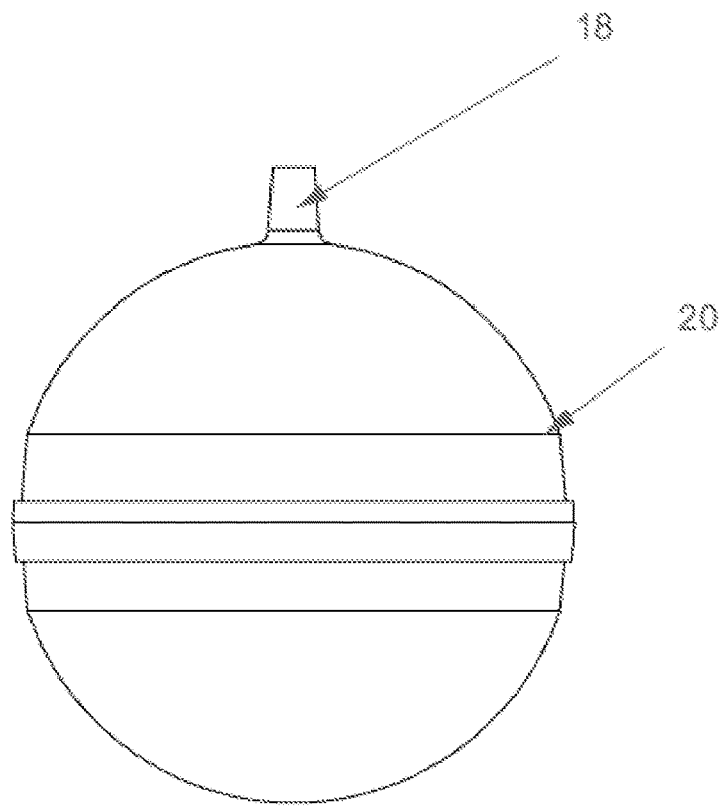

An example of a polycell (20) according to the present technology is shown in FIG. 1 and FIG. 2. The polycell (20) is formed by joining a first component (10) having a semispherical shell formed from a polymer and structural agent and a second component (12) having a semispherical shell formed from a polymer and structural agent. The first component (10) has a first circumferential edge (14), the second component (12) has a second circumferential edge (16). The first circumferential edge (14) and second circumferential edge (16) are adapted to engage to allow joining of the first component (10) and second component (12) to form the polycell (20) having a substantially spherical hollow body.

A filling port (18) is provided on the second component (12) which is adapted to receive an agent to treat an animal in the polycell (20). It will be appreciated that the filling port (18) can be provided on the first component (10). After filling is completed the filling port is also used to hermetically seal the polycell (20) by hermetic sealing by heat welding using a specially shaped heated tamper. The polycell (20) is rotated while the heated tamper is lowered slowly melting the filling port (18) while the polycell (20) is cooled with bursts of pressurized air or $CO_2$. The result is prevention of flashing of volatile fill materials such as isopropyl alcohol, flashing causes internal pressure resulting in outgassing which prevents the creation of a hermetic seal as the molten polymer cools. Using the cooling method described it is possible to use the molten material to form a plug that hermetically seals contents inside the polycell (20).

In an embodiment the shell of the polycell (20) has a wall thickness of about 1 mm or less. In an embodiment the wall thickness can be about 0.3 mm.

In an embodiment the shell of the polycell (20) is impervious to water and substantially stable to excipients and diluents used in liquid formulations of biologically active agents suitable for veterinary applications.

In an embodiment the first component (10) and second component (12) are made by injection moulding.

In an embodiment the first component (10) and second component (12) are made by blow moulding each half.

In an embodiment the first component (10) and second component (12) are joined by heat welding about the first edge (14) and second edge (16) to form the polycell (20).

In an embodiment the first component (10) and second component (12) are joined by laser welding, ultrasonic welding, friction welding or bonding agent A dosage projectile suitable for administering a biologically active agent to an animal remotely can be formed by adding an agent to treat an animal to a polycell (20) through the filling port (18), and sealing the filling port (18) by hermetic sealing using a heat welding process.

In an embodiment there is provided a joint system to facilitate joining of the first component (10) and the second component (12) about the edge (14) of the first component (10) and the edge (16) of the second component (12). In one form part of the edge (14) of the first component (10) overlaps part of the edge (16) of the second component (12). The overlapping edges on the first component (10) and second component (12) clip together to form an outer surface suitable for joining together using heat to create a hermetic seal.

Joining the Components

The need to permanently join (or weld) two or more separate components of the same or different materials to make a polycell occurs when parts or products with made separately through separate processes due to different materials and or complex geometry and or hollow (such as a Polycell) cannot be made as one piece as they can be made with extrusion, blow moulding, rotation, spin moulding, 3D printing or 3D layering. In the case of Polycells, the very thin wall thickness and joint geometry needs to be consistent and repeatable (to achieve performance characteristics). Parts with fine tolerances and very thin wall sections (circa <1 mm) are difficult to join permanently. Traditional methods welding include, spin welding, vibration welding, ultrasonic welding, laser welding, adhesive welding and heat welding. Each of these methods requires specialist equipment and experienced technicians. The polymer selection, product performance characteristics and material and process costs are critical elements in the selection and inclusion of the welding process of thin walled parts. For instance, laser welding is a potential solution but the cost of materials and the process can reduce commercially viability. Adhesion welding is negatively affected by the bonding materials (epoxy, cyanoacryates, UV activated glues) and the parts are too thin for, vibration and ultrasonic welding to be successful using standard commercial equipment. Polypropylene does not conduct heat or cold well so pressure, joint geometry, high temperature and speed of the weld has been a factor in the development of a low cost high, volume repeatable welding process of the Polycell male and female parts. These Polycell parts have been designed, modified and refined for the specific heat welding process.

Filling and Sealing the Polycell

The Polycell has been designed with a filling port or spigot to facilitate the filling and hermetic sealing of the Polycell. The filling of the Polycell is straightforward, however, the sealing of the spigot is complicated by the size and geometry of the spigot necessary to provide adequate material to seal the filling port hermetically. Just as the Polycell parts are difficult to weld together, all the methods to join the parts (above) are unsuitable for sealing the filling port hole. The Polycell relies on the size and geometry of the filling port and a proprietary "crimping" and/or "tamping" process to use heat, pressure and a shaped tamper to reform the spigot into a molten 'plug'. Complicating this process is when flammable fill materials that are being encapsulated. With low flash point (liquid to gas transition temperature @ circa 20° C.) and high melting point (190-232° C.) the surface and fill material may be cooled to reduce/negate the flashing of the fill material during the sealing process. If the fill material is overheated, the flashing of the fill material creates gassing and increased pressure, this pressure attempting to escape out of the spigot potentially compromising the hermetic seal of the spigot plug. Again, the Polycell filling port and filling and sealing equipment can be designed to facilitate quick filling and hermetic sealing (by heat welding) of a low surface energy polymer in the presence of low flash point, flammable material.

FIG. 4 shows a dosage projectile (22) after the filling port (18) of the polycell (20) containing an active agent has been melted to form a plug (24).

The integrity of the formed dosage projectile (22) can be checked by rear light illumination of the projectile to inspect the weld seam and the plug. This can be done manually or using specially developed algorithms and machine vision applications (24).

Types of Polymers

Crystallization of polymers involves various degrees of alignment of their molecular chains. These chains fold together and form ordered regions which the create larger spheroidal structures. Polymer crystallization can be achieved by cooling, mechanical stretching or using solvents (typically evaporation). Crystallization affects the optical, mechanical, thermal and chemical properties of the polymer. The degree of crystallinity can be estimated using different analytical methods but typically ranges between 10% and 80%, thus crystallized polymers are often called "semi-crystalline". The properties of such polymers are determined not only by the degree of crystallinity, but also by the size and orientation of the molecular chains. Tacticity is a term used to describe the way pendent groups on a polymer chain are arranged on a polymer backbone. The tacticity of a polymer is determined by what side of the polymer chain the pendant groups are on. This relative position can have dramatic effects on the physical properties of the polymer. Tacticity only arises when there is an asymmetric carbon in the polymer chain backbone. Typically, this occurs in free radical polymerization of vinyl monomers. When a non-reacted monomer adds to the end of the polymer chain, the monomer can either join the pendant group on the same side as all of the other pendant groups, or it can join the pendant group on the side away from the nearest pendant group. If the monomer adds to the polymer backbone with the pendant group (X) on the same as the previous pendant group, this is called isotactic. If the monomer adds where the pendant group adds to the opposite side of the polymer backbone, it is called syndiotactic. If there is no order to the way the pendant group adds, (completely random) the polymer is said to be atactic.

When developing a polymer for the Polycell technology it is relevant to consider the mechanical properties that the polymer needs to exhibit and the structural agents required to impart the necessary performance characteristics. There are many aspects to controlling the physical properties of the polymer. Isotactic and syndiotactic polymers provide long-range order, which leads to higher crystallinity in the polymer chain. The polypropylene used in the one embodiment of the Polycell technology is a good example of how tacticity has a dramatic effect on the physical properties of the polymer. Atactic polypropylene has little order in the polymer backbone and is amorphous. Most commonly, amorphous polypropylene is called linear low-density polypropylene (LLDPE). This polymer is clear and used in soda bottles. Isotactic polypropylene (HDPE) has long-range order, which adds mechanical strength and crystallinity. This version of polypropylene is used in laundry detergent bottles and is not transparent like LLDPE.

Tacticity of a non-uniform monomer such as propylene in a polymer chain affects the Tg (glass transition) of the polymer. Tacticity can also affect other properties: isotactic polypropylene has higher strength and a higher tg and tm than all other common polyolefins, and syndiotactic polypropylene in film form has higher elasticity than other homopolymer polyolefins.

If a polymer consists of only one kind of monomer then it is called a homopolymer, while a polymer which consists of more than one kind of monomers is called a copolymer. In one embodiment the Polycell is formed from Polypropylene as a homopolymer filled with 20% glass bead and 20% glass fibre.

Polymer Examples

In an embodiment the polymer is an organic polymer is selected from:
  polyamide polymers including those derived from sebacic acid,
  polymers derived from vegetable oil acids with or without dimerization, terephthalic acid and/or ethylenediamine,
  polypropylene homopolymers or copolymers,
  polyphenylene sulphide,
  polylactic acid, and
  monomers of ethylene.

In an embodiment the polymer may be processed in such a way as to deliver atactic, syndiotactic or isotactic polymerization, subjected to UV light and or mechanically stretched in order to develop desirable polymer crystallization and compatibility with the structural agents to produce the desired hydrodynamic fragmentation characteristics.

The structural agent imparts or enhances the required properties to the shell so the polycell can be used as a dosage projectile. In an embodiment the structural agent can be selected from Silicon dioxide, Sodium carbonate, Calcium oxide, Magnesium oxide, Aluminium oxide, Glass spheres, Glass bubbles, Glass fibres, Glass rods, Calcium carbonate, and Talcum powder.

In an embodiment the polycell is made from atactic polypropylene with about 40% structural agent comprised of about 80% silicon dioxide, about 15% sodium carbonate, about 4% calcium oxide, about 0.5% magnesium oxide, and about 0.5% aluminium oxide.

In an embodiment the polycell is made from polypropylene homopolymer with structural agent comprising about 1 to 55% (wt/wt) glass beads and about 1 to 55% (wt/wt) glass fibre.

In an embodiment the polycell is made from polypropylene homopolymer with structural agent comprising about 1 to 55% (wt/wt) glass bubbles and about 1 to 55% (wt/wt) glass fibre.

In an embodiment the polycell is made from polypropylene copolymer with structural agent comprising about 20% (wt/wt) glass beads and about 20% (wt/wt) glass fibre.

In an embodiment the polycell is made from polyphenylene sulphide with structural agent comprising between about 20% and 70% silicon dioxide.

In an embodiment the polycell is made from a polymer selected from polyvinyl chloride with structural agent comprising about 1 to 55% (wt/wt) calcium carbonate and 1 to 55% glass bubbles In an embodiment the polycell is made from a polymer selected from monomers of ethylene with structural agent comprising between about 20% glass bubbles and 70% glass rods.

In an embodiment the shell has a wall thickness of about 1 mm or less.

In an embodiment the wall thickness of the shell is about 0.3 mm.

In an embodiment the polymer has one or more properties selected from:

- Melt Flow Rate 12+g/10 min;
- Tensile elongation 0.5-2.75% ASTM D638;
- Izod notched 25-50 J/m ASTM D256;
- Izod un-notched 50-170 J/m ASTM D256;
- Melting Temp 180-250° C.;
- Mold Temp 30-80° C.;
- Mold Shrinkage 0.10-0.50% ASTM D955; and
- Injection Pressure 60-120 Mpa.

In an embodiment the polymer has one or more further properties selected from:

Specific Gravity (SG) 0.9-1.50%;
Tensile Strength 30-50 Mpa ASTM D638;
Tensile Modulus 2000-5000 Mpa ASTM D638;
Flexural Strength 50-80 Mpa ASTM D790; and
Flexural Modulus 2500-50 Mpa ASTM D790.

In an embodiment the polymer is polypropylene homopolymer with about 20% (wt/wt) glass beads and about 20% (wt/wt) glass fibre having the properties:
Melt Flow Rate 20 g/10 min;
Tensile elongation 2.5% ASTM D638;
Izod notched 43 J/m ASTM D256;
Izod un-notched 160 J/m ASTM D256;
Melting Temp 191-232° C.;
Mold Temp 32-66° C.;
Mold Shrinkage 0.3% ASTM D955;
Injection Pressure 69-103 Mpa;
Specific Gravity (SG) 1.22%;
Tensile Strength 39 Mpa ASTM D638;
Tensile Modulus 4826 Mpa ASTM D638;
Flexural Strength 63 Mpa ASTM D790; and
Flexural Modulus 4482 Mpa ASTM D790.

In an embodiment the shell of the polycell is impervious to water and substantially stable to excipients and diluents used in liquid formulations of biologically active agents suitable for veterinary applications.

Table 1 shows ranges of a number of properties of polymers suitable for the present technology and the properties of one embodiment SVT 200X126486B.

Fragmentation Pattern

Toughness is a desirable characteristic in the polymer industry. The current technology designs away from the polymer industry common practice of brittleness (i.e. lack of toughness) being an undesirable trait. The invention has involved the incorporation of certain additives into a commodity polymer to cause the new polymer to perform in a manner specifically suited to SmartVet's unique application. For the present technology, the type of embrittlement imparted to the shell of the dosage projectile should ensure that when the projectile fails, it does so in a specific manner provided by the 'frangibility' or 'fragmentation' properties of the polycell (20). Good animal delivery of active agents requires impact energy transmission to fragment the dosage projectile in such a way that the maximum payload of the projectile is delivered onto the impacted animal surface.

Conversely, if a commodity polymer alone is used, the projectile will bounce off the target animal as a result of it being too tough. If an attempt to remedy this issue is to decrease the wall thickness, then the inherent elasticity of commodity polymers (with the exception of polystyrene) effectively results in compression at the point of impact. The resultant increase in internal pressure causes the projectile to stretch/expand until it reaches bursting point, which then causes the ejection of the liquid payload in all directions. For these reasons this is undesirable when treating an animal with a topically applied biologically active agent.

TABLE 1

| Polymer Properties | | | | | | |
|---|---|---|---|---|---|---|
| Mechanical Properties | | | | | | |
| Material | Melt Flow Rate (g/10 min) | Tensile elongation % ASTM D638 | Izod notched (J/m) ASTM D256 | Izod un-notched (J/m) ASTM D256 | Melting Temp ° C. | Mold Temp ° C. |
| X | 12+ | 0.5-2.75 | 25-50 | 50-170 | 180-250 | 30-80 |
| SVT 200X126486B | 20 | 2.5 | 43 | 160 | 191-232 | 32-66 |

| Material | Mold Shrinkage % ASTM D955 | Injection Pressure (Mpa) | Specific Gravity (SG) % | Tensile Strength (Mpa) ASTM D638 | Tensile Modulus (Mpa) ASTM D638 | Flexural Strength (Mpa) ASTM D790 | Flexural Modulus (Mpa) ASTM D790 |
|---|---|---|---|---|---|---|---|
| X | 0.10-0.50 | 60-120 | 0.9-1.50 | 30-50 | 2000-5000 | 50-80 | 2500-5000 |
| SVT 200X126466B | 0.3 | 69-103 | 1.22 | 39 | 4826 | 63 | 4482 |

SVT 200X126486B-20% glass bead and 20% glass fibre-filled polypropylene homopolymer Performance Parameters of Dosage Projectiles There are a number of factors that can render the present technology both effective and commercially advantageous. In paintball, it is a desirable characteristic to have the burst pattern splatter the paint in as many directions as possible, this is how a competitor is 'marked' and thereby eliminated from the game. In veterinary medicine applications this is highly undesirable characteristic. By studying the hydrodynamic behaviour of the contents of the dosage projectile on impact, the polymer and structural agents have been developed to impart a fragmentation pattern that minimizes splatter and maximizes the delivery of the contents onto a focal area of the surface of the animal, thereby providing more effective treatment delivery.

Figure 3:
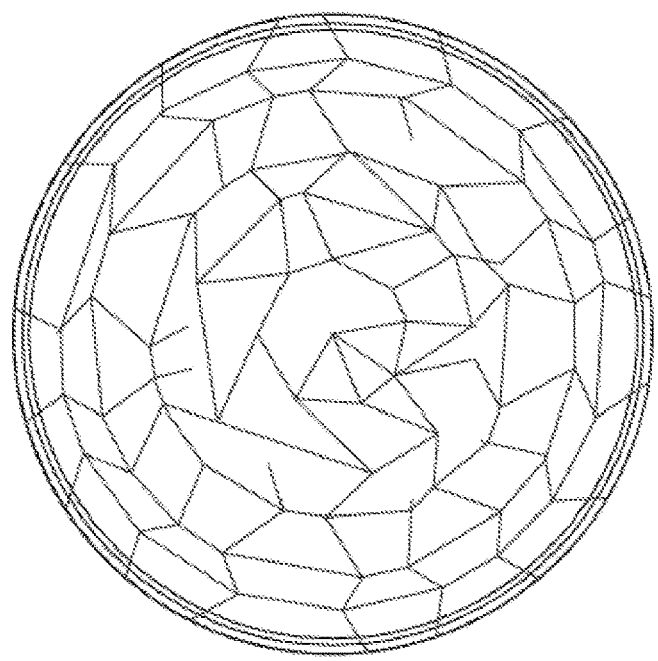
Figure 4:
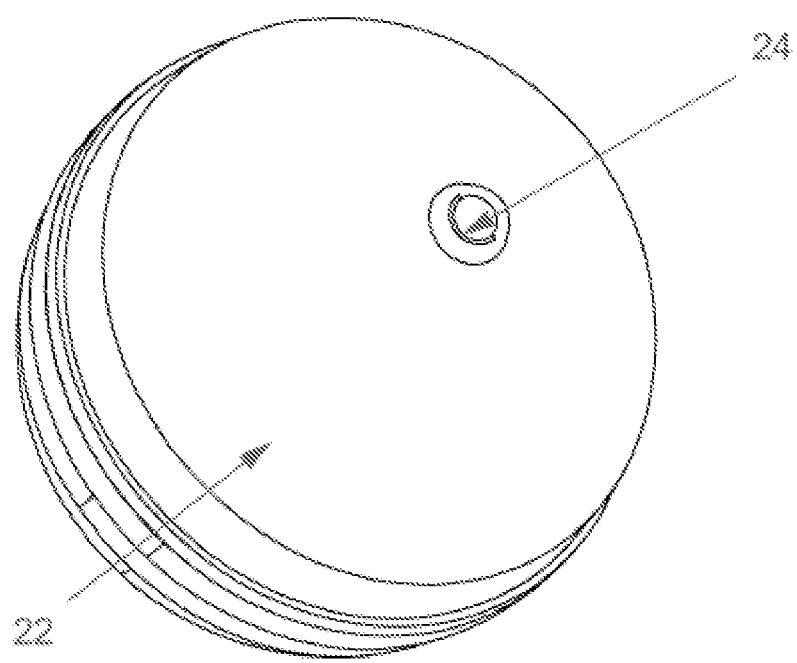

FIG. 3 shows a typical fragmentation pattern of the leading face of a dosage projectile formed from a polycell (20) at impact. Desired payload delivery can result from the polymer characteristics used in the polycell which cause a desirable type of frangibility. In an embodiment, the polycell begins fragmenting immediately on impact allowing the hydrodynamic movement of the liquid payload in forward direction so it is released in such a manner as to achieve maximum focus of contents (payload) around the point of impact. This in turn maximizes the effectiveness of the treatment delivery to the animal. The polymer characteristic can be observed from a 'spider web' pattern of energy transmission, which demonstrates a desirable 'lack of toughness' resulting in this fragmentation pattern.

Firing Performance

The dosage projectile is about 2.5× larger than a standard paintball and subjected to a different level of force. The level of brittleness imparted by the shell is a fine balance, the polycell (20) needs to be tough enough to withstand the forces exerted upon it while being fired using compressed gas, yet brittle enough to burst reliably on impact and, in addition, it is beneficial to fragment in such a way as to deliver the maximum payload onto the impact surface.

Chemical Resistance

While soft gelatine (softgel) is widely used in human and veterinary medicine, it has many chemical resistance limitations, particularly when transdermally or transcutaneously administered products are involved. For example, some of the most commonly used solvents/excipients used in pour-on type veterinary drugs such as Dipropyleneglycol monomethyl ether, diethylene glycol monobutyl ether (and even any excipient containing a significant proportion of water) cannot be encapsulated using current softgel technology. In addition, as a custom softgel formulation has to be designed for each excipient combination, this is complex, time consuming and unpredictable as any lack of stability can sometimes take months to reveal itself. This restrains chemical formulation and testing of new veterinary drugs and exponentially increases R&D costs. Important to note is that there are commodity polymers with desirable physical performance characteristics (in terms of fragmentation and level of brittleness) such as polystyrene, but none of these are chemically resistant to commonly used excipients such as isopropyl alcohol, corn oil or N-Methyl-2-pyrrolidone (NMP). A major advantage of preferred embodiments of the present technology is a very wide range of chemical resistance to excipients currently used in topically applied veterinary drugs. This enables the use one shell formula for many products dramatically improving R&D timelines and product time to market.

Humidity Resistance

Softgel is highly susceptible to humidity and readily absorbs water from the air. Absorption accelerates as ambient temperature and or humidity increases, which in turn causes softgel to become more elastic. On impact this causes it to compress and increase in internal pressure until it reaches bursting point, which then causes the ejection of the liquid payload in all directions. This is undesirable when treating an animal with a topically applied medicine. From a commercial perspective this complicates, and consequently increases the cost of, everything from production through packaging through, logistics, marketing and customer support. Polycells according to the present technology are substantially impervious to moisture with water absorption when tested according to the ASTM test D570 of 0.04% after 24 hrs at 23° C.

Temperature Tolerance

Softgel is highly susceptible to temperature which causes variability partially due to its tendency to absorb water. As softgel approaches 0° C. it becomes increasingly brittle, causing it to burst in the gun. As temperatures exceed 30° C. softgel becomes increasingly elastic causing it to bounce off the animal. This lack of frangibility translates into substandard payload delivery and ineffective treatment. The polycells according to the present technology can withstand temperatures of −10° C. and up to 50° C. for over 24 hours and still perform reliably.

Processability

The manufacturing of softgel is complex, requiring multi-million dollar investments in highly specialized equipment and facilities as well as needing specially trained personnel. In contrast, once the parameters are known and the tooling and equipment is properly designed, manufacturing systems for the present technology can be easier and less expensive to develop. A consideration during base polymer selection and development (additive selection) was to allow manufacturing to be done using high volume industry manufacturing processes such as injection moulding (albeit using custom high precision tooling to assist with uniformity of thickness and shape of very thin walled parts i.e. about 0.3 to 1.00 mm). An aim to achieve this at a manufacturing scale and requisite cost is developing a polymer with the requisite high flow rates and low processing temperatures while retaining compatibility with additives/fillers such as glass beads and fibres. In addition, quantities of fillers that may impart the required performance characteristics can be determined. It is desirable not to overly complicate manufacturing or cause unacceptable wear on equipment (which is common when high glass loads of filler are used). There is therefore a manufacturing interrelationship between key elements of base polymer, fillers, manufacturing system (injection moulding), part design (polycell), tool design and the custom design of equipment used to weld the parts together and fill and seal them effectively.

Launcher

The dosage projectiles according to the present invention can be delivered to an animal by any suitable launcher. The launcher may be handheld, anchored or position in stationary location, or associated with a mobile platform such as a vehicle or drone.

The launcher can be an air or gas powered launcher. The launcher can include a magazine or reservoir for accepting a plurality of projectiles. Administering an agent to an animal is accomplished by a person or user aiming the launcher containing one or more projectiles at the animal, and launching a projectile at the animal with a velocity sufficient to deliver the agent to the animal. For non-skin piercing projectiles, this allows the contents of the projectile to be splattered onto the skin of the animal, allowing the agent to be located or absorbed through the skin of the animal.

The dosage projectiles may have sufficient volume to contain a unit dosage for treating the animal. The dosage is typically calculated to correspond to a certain minimum weight of animal to which a pesticide is to be administered. If larger animals are to be treated, the number of projectiles per animal may be increased accordingly. Alternatively, a single projectile dosage for all animal weights may be preserved by alteration of the formulation concentration of the active pharmaceutical agent.

The launcher can have a selector button which allows a user to pre-select the number of projectiles to be launched at the single pull of a trigger of the launcher, thereby allowing larger animals to be treated with the correct dose required, merely by selecting the number of projectiles to be launched substantially simultaneously. This has the advantage that the animal does not have a chance to escape following the first firing of the launcher, as the projectiles reach it substantially simultaneously. Launching one projectile at a time may result in the animal fleeing, making it difficult to track down the same animal and administer a second (or different) dose.

Similarly, it may be necessary to treat an animal with a combination of agents. This may be accomplished by using a projectile containing a combination of agents. However, it is not always possible to produce a projectile having two or more different agents therein, due to adverse reactions occurring between such agents when they are co-mixed.

Treatment

The dosage projectiles can contain one or more biologically active agents for treating an animal.

The biologically active agent is typically present at a concentration (% v/v) of from about 0.1% to 20%. It will be appreciated that the concentration of the biologically active agent will be related to the dosage required for a particular size of animal.

The biologically active agent can be a pharmacological agent such as a veterinary pharmaceutical for treating insect pests or disease.

The biologically active agent can be a health supplement such as a vitamin or mineral.

The biologically active agent can be a vaccine or immunogenic compound. The biologically active agent may also include protein-based agents, such as crude or purified cell lysates, sub-unit vaccines, protein-based antigen display systems, antigens, peptides, oligopeptides, or polypeptides.

The biologically active agent may include drugs such as contraceptives, analgesics, anti-inflammatories, vasodilators, bronchodilators, diuretics, anti-histamines, tranquilizers, anti-fungals, vitamins, muscle relaxants, and anti-virals, anti-parasitic compositions, anthelmintics, acaricides, insecticides, and the like.

The biologically active agent may include a hormone such as a progesterone, estrogen, testosterone, derivatives thereof, and/or combinations of such hormones.

The biologically active agent may be poison or toxin used to kill an animal following administration or consumption.

The treatment of the animal may be for a parasite, pest, illness, nutritional deficiency, vaccination, pain management, management of fever (pyrexia), bacterial or viral infections, growth promotion, hormones, steroids, fertility enhancing agents or contraceptive agents, sterilization, appetite stimulants, rumen activity modulators.

Pests

The target pest may be an insect horn fly, face fly, stable fly, heel fly, warble fly, bot fly, house fly, horse fly, deer fly, blow fly, mosquito, midge, flea or louse.

The target pest may be an arachnid such as a tick or mite

The target pest may be a helminth such as a roundworm, stomach worm, tapeworm, or trematoda such as a flatworm or fluke.

The target pest may be a protozoan such as a coccidian.

In some embodiments the target pest may be an adult pest, a larvae, pupae, egg or any combination thereof.

Biologically Active Agent

The dosage projectile includes at least one agent such as a pesticide. The pesticide can be encapsulated in a controlled-release coating prior to inclusion in the dosage projectile thereby allowing the controlled release of the pesticide within an animal to be treated animal, once it has passed transdermally into the blood or lymphatic system of the animal. The controlled-release coating may be selected from controlled release compositions known in the field.

The viscosity of the projectile contents can be such that the contents do not run off the skin, fur or coat of the animal prematurely before treatment has occurred. Accordingly, the projectile may also include a thickening agent, such as a starch-like compound, inert polymer, gel, or an oil-based composition such as sesame seed oil, if required.

The pesticides contained in the projectile can be in different forms and/or concentrations, depending on the formulation, the carrying capacity, and solubility and release characteristics desired, for example as neutral molecules, components of molecular complexes, and pharmaceutically acceptable salts, free acids or bases, or quaternary, salts thereof. Simple derivatives of the pesticides mentioned herein, such as pharmaceutically acceptable ethers, esters, amides and the like which have desirable retention and release characteristics in vivo, and enzymes, pro-active forms, pro-drugs and the like, can also be employed as required.

The dosage projectiles may include additional components to enhance the effectiveness of the agents or to reduce discomfort to an animal.

In some embodiments the dosage projectile may include a transdermal carrier. The term 'transdermal carrier' or refers to any material known in the art as being suitable for transdermal pesticide administration, and includes any polymeric material into which a pesticide may be solubilised in combination or admixture with the other ingredients to form a composition. The term also includes enhancers, solvents, co-solvents, carriers and other types of additives useful for facilitating transdermal pesticide delivery, or adhesives for ensuring adhesion of the contents of the projectile to the skin, coat or fur of a target animal.

The amount of pesticide to be complexed with the transdermal carrier will vary depending on the particular pesticide, and the time span for which the pesticide effective. Normally, the amount of pesticide in the transdermal system can vary from about 0.1% to about 50%, or even from about 0.1% to about 30% by weight based on the dry weight of the total carrier composition. Persons skilled in the field of the invention will be able to determine the adequate amounts required for each application, as required.

It is to be appreciated that the order of steps, the amounts of the ingredients, and the amount and time of mixing may be important process variables which will depend on the specific polymers, pesticides, solvents and/or co-solvents, enhancers, additives and/or excipients used in the composition.

The transdermal carrier, if used, is typically used in an amount of about 1% to about 95%, and preferably from about 10% to about 75%, by weight based on the weight of the total carrier composition.

The transdermal carrier composition can also contain one or more solvents and/or co-solvents known in the art.

Suitable solvents and co-solvents include volatile substances or compositions such as alcohols, aromatic hydrocarbons such as benzene derivatives, lower molecular weight alkanes and cycloalkanes, alkanoic acid esters, polyhydric alcohols, which include glycols, triols and polyols such as ethylene glycol, diethylene glycol, propylene glycol, dipropylene glycol, trimethylene glycol, butylene glycol, polyethylene glycol, hexylene glycol, polyoxethylene, glycerin, trimethylpropane, sorbitol, polyvinylpyrrolidone, glycol ethers such as ethylene glycol monoethyl ether, glycol esters, glycol ether esters such as ethylene glycol monoethyl ether acetate and ethylene glycol diacetate; saturated and unsaturated fatty acids, mineral oil, silicone fluid, lecithin, retinol derivatives and the like, and ethers, esters and alcohols of fatty acids, or combinations and mixtures thereof.

Although the exact amount of solvents and co-solvents that may be used in the carrier composition depends on the nature and amount of the other ingredients, such amount typically ranges from about 0.1% to about 50%, and preferably from about 0.1% to about 30% by weight, and more preferably from about 1% to about 20%, by weight based on the dry weight of the total carrier composition.

The transdermal carrier is typically selected so that it may be readily absorbable by the skin of an animal without causing undue itching, irritation, or toxic effects to the animal. Selection of the transdermal carrier will also depend on the pesticide to be delivered to an animal and also the type of animal to be treated, or the intended delivery site on an animal. Thus, the transdermal carrier composition may be selected to suit the charge, size, hydrophobicity, hydrophilicity, amphipathicity, pI, pH, decay rate, or other relevant criteria of the pesticide to be carried transdermally, while also being readily absorbable through the skin of an animal.

Typically, the transdermal carrier includes compounds such as isopropyl alcohol, dipropylene glycol methyl-ether, butylated hydroxytoluene dipropylene glycol monomethyl-ether, methylene chloride, 1-methoxy 2-propanol (glysolv PM/Icinol PM), Ethylene glycol monobutylether (butyl glyxolv/butyl icinol), Butyl di glysolv (butyl-icinol), Transcutol, propylene glycol (PG), N-methyl-2 pyrrolidone (NMP), diethyl ether, ethanol, acetonitrile, ethyl acetate, benzyl alcohol and a combination of natural oils. ethylene glycol, propylene glycol, dimethyl polysiloxane (DMPX), oleic acid, caprylic acid, 1-octanol, ethanol (denatured or anhydrous), liposomal compositions, suitable plant oils, such as Aloe vera derivatives or sesame seed oil or derivatives thereof, acrylic polymers, rubber-based polymers, polysiloxane-based polymers, polyvinylpyrrolidone-based polymers, dimethylsulfoxide (DMSO), dimethylformamide (DMF), lecithin, Transfersomes®, ethosomes, azone, castor oil derivatives, such as ethoxylated castor oil, jojoba oil derivatives, corn oil derivatives, emu oil derivatives, or other suitable carriers.

An enhancer can be incorporated into the carrier composition. The term 'enhancers' as used herein refers to substances used to increase permeability and/or accelerate the delivery of an active agent through the skin of an animal, and include monohydric alcohols such as ethyl, isopropyl, butyl and benzyl alcohols; or dihydric alcohols such as ethylene glycol, diethylene glycol, or propylene glycol dipropylene glycol and trimethylene glycol; or polyhydric alcohols such as glycerin, sorbitol and polyethylene glycol, which enhance drug solubility; polyethylene glycol ethers of aliphatic alcohols (such as cetyl, lauryl, oleyl and stearly) including polyoxyethylene-4-lauryl ether, polyoxyethylene-2-oleyl ether and polyoxyethylene-10-oleyl ether; vegetable, animal and fish fats and oils such as cotton seed, corn, safflower, olive and castor oils, squalene, and lanolin; fatty acid esters such as propyl oleate, decyl oleate, isopropyl palmitate, glycol palmitate, glycol laurate, dodecyl myristate, isopropyl myristate and glycol stearate which enhance drug diffusibility; fatty acid alcohols such as oleyl alcohol and its derivatives; fatty acid amides such as oleamide and its derivatives; urea and urea derivatives such as allantoin which affect the ability of keratin to retain moisture; polar solvents such as dimethyldecylphosphoxide, methyloctylsulfoxide, dimethyllaurylamide, dodecylpyrrolidone, isosorbitol, dimethylacetonide, dimethylsulfoxide, decylmethylsulfoxide and dimethylformamide; salicylic acid; benzyl nicotinate; or higher molecular weight aliphatic surfactants such as lauryl sulfate salts, esters of sorbitol and sorbitol anhydride such as polysorbate. Other suitable enhancers include oleic and linoleic acids, triacetin, ascorbic acid, panthenol, butylated hydroxytoluene, tocopherol, tocopherol acetate, tocopheryl linoleate.

If enhancers are incorporated into the carrier composition, the amount typically ranges up to about 35%, and preferably from about 0.05% to about 20%, by weight based on the dry weight of the total carrier composition.

Pesticides

It is contemplated that any pesticide which is deliverable to an animal to produce a desired, usually beneficial, effect may be used in the methods and treatment regimens of the present invention. It should be noted that the pesticides can be used singularly or in combinations or mixtures as required.

Examples of pesticides include parasiticides and/or anthelmintics which include, but are not limited to the following:

Macrocyclic lactones including the avermectins and milbemycins, for example Ivermectin, eprinomectin, moxidectin, selamectin, doramectin, milbemycin, abamectin, cydectin and emamectin benzoate.

Synthetic pyrethroids such as flumethrin, deltamethrin, cypermethrin, cyfluthrin, lambda cyhalothrin, fenvalerate, alphacypermethrin and pyrethrin.

Insect growth regulators such as pyriproxifen, methoprene, cyromazine, lufenuron, diflubenzuron, fluazuron, dicyclanil and fluazuron.

Anthelminitics such as fipronil, imidacloprid, rotenone, magnesium flurosilicate, piperonyl butoxide, spinosyns and other suitable benzimidazole anthelmintics and immunomodulators (e.g. Levamisole).

Anthelmintic, anti-trematodal, anticestodal, or anti-parasitic/parasiticidal agents such as albendazole, levamisole, mebendazole, pyrantel, praziquantel, moxidectin, ivermectin, oxamniquine, metrifonate, piperazine, thiabendazole, tiabendazole, diethylcarbamazine, pyrantel, niclosamide, doramectin, eprinomectin, morantel, oxfendazole, dichlorvos, chlorsulon and selamectin.

The pesticide may be a pro-insecticide being a compound that is metabolized into an active insecticide after entering the host or target insect. The pro-insecticide may be derived from a microbially produced compounds for example halogenated pyrroles, an example of this class being chlorfenapyr, caricides, nikkomycins, thuringiensin, macrocyclic lactones, acaricides, tetranactin, avermectin, acaricides, abamectin, doramectin, eprinomectin, ivermectin, selamectin, milbemycin, acaricides, milbemectin, milbemycin oxime, moxidectin, bridged diphenyl acaricides, azobenzene, benzoximate, benzyl benzoate, bromopropylate, chlorbenside, chlorfenethol, chlorfenson, chlorfensulphide, chlorobenzilate, chloropropylate, cyflumetofen, dicofol, diphenyl sulfone, dofenapyn, fenson, fentrifanil, fluorbenside, proclonol, tetradifon, tetrasul, carbamate acaricides, benomyl, carbanolate, carbaryl, carbofuran, methiocarb, metolcarb, promacyl, propoxur, oxime carbamate caricides, aldicarb, butocarboxim, oxamyl, thiocarboxime, thiofanox, dinitrophenol acaricides, binapacryl, dinex, dinobuton, dinocap, dinocap-6, dinocton, dinopenton, dinosulfon, dinoterbon, DNOC, formamidine acaricides, amidines, amitraz, chlordimeform, chloromebuform, formetanate, formparanate, mite growth regulators, clofentezine, diflovidazin, dofenapyn, fluazuron, flubenzimine, flucycloxuron, flufenoxuron, hexythiazox, organochlorine acaricides, bromocyclen, camphechlor, dienochlor, endosulfan, lindane, organophosphorus acaricides, organophosphate acaricides, chlorfenvinphos, crotoxyphos, dichlorvos, heptenophos, mevinphos, monocrotophos, TEPP, tetrachlorvinphos, organothiophosphate acaricides, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton, demeton-O, demeton-S, demeton-methyl, demeton-O-methyl, demeton-S-methyl, demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phoxim, pirimiphos-methyl, prothidathion, prothoate, pyrimitate, quinalphos, quintiofos, sophamide, sulfotep, thiometon, triazophos, trifenofos, vamidothion, phosphonate acaricides, trichlorfon, phosphoramidothioate acaricides, isocarbophos, methamidophos, propetamphos, phosphorodiamide caricides, dimefox, mipafox, schradan, organotin acaricides, azocyclotin, cyhexatin, fenbutatin, phenylsulfamide acaricides, dichlofluanid, phthalimide acaricides, dialifos, phosmet, pyrazole acaricides, acetoprole, fipronil, tebufenpyrad, vaniliprole, pyrethroid acaricides, pyrethroid ester caricides, acrinathrin, bifenthrin, cyhalothrin, cypermethrin, alpha-ypermethrin, fenpropathrin, fenvalerate, flucythrinate, flumethrin, fluvalinate, tau-fluvalinate, permethrin, pyrethroid ether acaricides, halfenprox, pyrimidinamine acaricides, pyrimidifen, pyrrole acaricides, chlorfenapyr, quinoxaline acaricides, chinomethionat, thioquinox, sulfite ester caricides, propargite, tetrazine acaricides, clofentezine, diflovidazin, tetronic acid acaricides, spirodiclofen, thiocarbamate acaricides, fenothiocarb, thiourea acaricides, chloromethiuron, diafenthiuron, unclassified acaricides, acequinocyl, amidoflumet, arsenous oxide, bifenazate, closantel, crotamiton, disulfiram, etoxazole, fenazaflor, fenazaquin, fenpyroximate, fluacrypyrim, fluenetil, mesulfen, MNAF, nifluridide, pyridaben, sulfiram, sulfluramid, sulfur triarathene.

Cholinergic agents such as acetylcholine, arecoline, bethanechol, carbachol, choline, methacoline, muscarine and pilocarpine.

Anti-cholinergic agents such as atropine, eucatropine and procyclidine.

The amounts of the pesticide to be used in each dosage projectile may be determined by methods known to persons skilled in the art. Amounts typically range from about 0.05 mg to about 20,000 mg, and preferably from about 0.1 mg to about 1,000 mg, depending on the pesticide, the target, the animal species, the size of the animal. In certain embodiments of the invention, the pesticides may be included in a range from about 0.1 to about 500 mg per mammal per 50 kg body weight.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

LIST OF INTEGERS

| Numeral | Integer |
| --- | --- |
| 10 | First component |
| 12 | Second component |
| 14 | First edge |
| 16 | Second edge |
| 18 | Filling port |
| 20 | Polycell |
| 22 | Dosage projectile |
| 24 | Plug |

The invention claimed is:

1. A polycell for forming a dosage projectile suitable for administering a biologically active agent to an animal remotely, the polycell comprising:
a first component having a semispherical shell formed from a polymer selected from polyamide polymers including those derived from sebacic acid, polymers derived from vegetable oil acids with or without dimerization, terephthalic acid and/or ethylenediamine, polypropylene homopolymers or copolymers, polyphenylene sulphide, polylactic acid, or monomers of ethylene and a structural agent selected from silicon dioxide, sodium carbonate, calcium oxide, magnesium oxide, aluminium oxide, glass spheres, glass bubbles, glass fibres, glass rods, calcium carbonate, and talcum powder;

a second component having a semispherical shell formed from a polymer selected from polyamide polymers including those derived from sebacic acid, polymers derived from vegetable oil acids with or without dimerization, terephthalic acid and/or ethylenediamine, polypropylene homopolymers or copolymers, polyphenylene sulphide, polylactic acid, and monomers of ethylene and a structural agent selected from silicon dioxide, sodium carbonate, calcium oxide, magnesium oxide, aluminium oxide, glass spheres, glass bubbles, glass fibres, glass rods, calcium carbonate, and talcum powder; and a filling port in the first component or the second component;

wherein the first and second components are formed by injection moulding or blow moulding;

wherein the first and second components when joined form a polycell having a substantially spherical hollow body adapted to receive an agent to treat an animal;

wherein the polymer of the first and second components is processed to deliver atactic, syndiotactic or isotactic polymerization, subjected to ultra-violet light and/or mechanically stretched in order to develop polymer crystallization and compatibility with the structural agents to produce hydrodynamic fragmentation characteristics in the polycell.

2. The polycell according to claim 1, wherein the first component has a first circumferential edge, the second component has a second circumferential edge, wherein the first circumferential edge and second circumferential edge are adapted to form a temporary joint system that engages to allow permanent joining of the first and second components to form the polycell having a substantially spherical hollow body.

3. The polycell according to claim 2, wherein the joint system is about the edge of the shells to facilitate joining of the first and second components.

4. The polycell according to claim 3, wherein the joint system comprises overlapping edges on the first and second components that clip together to form an outer surface suitable for joining together using heat to create a hermetic seal.

5. The polycell according to claim 1 made from:

atactic polypropylene with about 40% structural agent comprised of about 80% silicon dioxide, about 15% sodium carbonate, about 4% calcium oxide, about 0.5% magnesium oxide, and about 0.5% aluminium oxide; or atactic polypropylene with about 40% structural agent comprised of about 80% silicon dioxide, about 15% sodium carbonate, about 4% calcium oxide, about 0.5% magnesium oxide, and about 0.5% aluminium oxide; or polypropylene homopolymer with structural agent comprising about 1 to 55% (wt/wt) glass beads and about 1 to 55% (wt/wt) glass fibre; or polypropylene copolymer with structural agent comprising about 20% (wt/wt) glass beads and about 20% (wt/wt) glass fibre; or polyphenylene sulphide with structural agent comprising between about 20% and 70% silicon dioxide; or
a polymer selected from polyvinyl chloride with structural agent comprising about 1 to 55% (wt/wt) calcium carbonate and 1 to 55% glass bubbles; or
a polymer selected from monomers of ethylene with structural agent comprising between about 20% glass bubbles and 70% glass rods.

6. The polycell according to claim 1, wherein the semispherical shell of the first and second components has a wall thickness of about 1 mm or less.

7. The polycell according to claim 6, wherein the wall thickness of the semispherical shell is about 0.3 mm.

8. The polycell according to claim 1, wherein the polymer of the first and second components has one or more properties selected from:
Melt Flow Rate 12+g/10 min;
Tensile elongation 0.5-2.75% ASTM D638;
Izod notched 25-50 J/m ASTM D256;
Izod un-notched 50-170 J/m ASTM D256;
Melting Temp 180-250° C.;
Mold Temp 30-80° C.;
Mold Shrinkage 0.10-0.50% ASTM D955; and
Injection Pressure 60-120 Mpa.

9. The polycell according to claim 8, wherein the polymer has one or more further properties selected from:
Specific Gravity (SG) 0.9-1.50%;
Tensile Strength 30-50 Mpa ASTM D638;
Tensile Modulus 2000-5000 Mpa ASTM D638;
Flexural Strength 50-80 Mpa ASTM D790; and
Flexural Modulus 2500-50 Mpa ASTM D790.

10. The polycell according to claim 1, wherein the polymer of the first and second components is polypropylene homopolymer with about 20% (wt/wt) glass beads and about 20% (wt/wt) glass fibre having the properties:
Melt Flow Rate 20 g/10 min;
Tensile elongation 2.5% ASTM D638;
Izod notched 43 J/m ASTM D256;
Izod un-notched 160 J/m ASTM D256;
Melting Temp 191-232° C.;
Mold Temp 32-66° C.;
Mold Shrinkage 0.3% ASTM D955;
Injection Pressure 69-103 Mpa;
Specific Gravity (SG) 1.22%;
Tensile Strength 39 Mpa ASTM D638;
Tensile Modulus 4826 Mpa ASTM D638;
Flexural Strength 63 Mpa ASTM D790; and
Flexural Modulus 4482 Mpa ASTM D790.

11. The polycell according to claim 1, wherein the semispherical shell of the first and second components is impervious to water and substantially stable to excipients and diluents used in liquid formulations of biologically active agents suitable for veterinary applications.

12. The polycell according to claim 1, wherein the first and second components are joined by:

heat welding; or
laser welding; or
friction welding; or
ultrasonic welding; or
using a bonding agent or glue; or
mechanical friction about the first and second edges to form a hermetically sealed polycell.

13. The polycell according to claim 1, wherein region of joining of the first and second parts does not substantially impede fragmentation of the polycell in use as a dosage projectile.

14. The polycell according to claim 1, having a size of about 21 mm diameter with a volume of about 9.8 ml.

15. A dosage projectile suitable for administering a biologically active agent to an animal remotely, the dosage projectile comprising:

a polycell according to claim 1; and
a biologically active agent sealed in the polycell to treat an animal.

16. The dosage projectile according to claim 15, wherein the biologically active agent is selected from:

a pharmacological agent selected from a veterinary pharmaceutical or pesticide for treating insect pests or disease;
health supplement selected from a vitamin or mineral;
vaccine or immunogenic compound;
drugs selected from contraceptives, analgesics, anti-inflammatoires, vasodilators, bronchodilators, diuretics, anti-histamines, tranquilizers, anti-fungals, vitamins, muscle relaxants, and anti-virals, anti-parasitic compositions, anthelmintics, acaricides, or insecticides;
hormone selected from a progesterone, estrogen, testosterone, derivatives thereof, and/or combinations of such hormones; and
poison or toxin used to kill an animal following administration or consumption.

17. The dosage projectile according to claim 16, wherein the biologically active agent is present at a concentration from about 0.1% to 30% (v/v).

18. A method for treating an animal remotely, the method comprising impacting a dosage projectile according claim 16 on an animal such that the dosage projectile fragments on impact to release the biologically active agent to treat the animal.

19. A method for making a dosage projectile of claim 15, suitable for administering a biologically active agent to an animal remotely, the method comprising:

forming a first component having a semispherical wall by injection moulding or blow moulding from a polymer selected from polyamide polymers including those derived from sebacic acid, polymers derived from vegetable oil acids with or without dimerization, terephthalic acid and/or ethylenediamine, polypropylene homopolymers or copolymers, polyphenylene sulphide, polylactic acid, and monomers of ethylene and structural agent selected from silicon dioxide, sodium carbonate, calcium oxide, magnesium oxide, aluminium oxide, glass spheres, glass bubbles, glass fibres, glass rods, calcium carbonate, and talcum powder;

forming a second component having a semispherical wall by injection moulding or blow moulding from a polymer selected from polyamide polymers including those derived from sebacic acid, polymers derived from vegetable oil acids with or without dimerization, terephthalic acid and/or ethylenediamine, polypropylene homopolymers or copolymers, polyphenylene sulphide, polylactic acid, and monomers of ethylene and structural agent selected from silicon dioxide, sodium carbonate, calcium oxide, magnesium oxide, aluminium oxide, glass spheres, glass bubbles, glass fibres, glass rods, calcium carbonate, and talcum powder; one of the first or second components having a filling port;

joining the first and second components to form a polycell having a substantially spherical hollow body having a filling port;

introducing an active agent into the polycell through the filling port; and sealing the filling port to form a dosage projectile containing the active agent.

* * * * *